United States Patent [19]

Wazaki et al.

[11] Patent Number: 5,000,280
[45] Date of Patent: Mar. 19, 1991

[54] DRIVING WHEEL SLIP CONTROL SYSTEM FOR VEHICLES

[75] Inventors: Yoshio Wazaki; Tetsuya Ono; Norio Suzuki, all of Wako, Japan

[73] Assignee: Honda Giken Kogyo Kabushiki Kaisha, Tokyo, Japan

[21] Appl. No.: 504,227

[22] Filed: Apr. 4, 1990

[51] Int. Cl.$^5$ ............................................. B60K 28/10
[52] U.S. Cl. ................................ 180/197; 364/426.03; 123/345
[58] Field of Search ................... 180/197; 364/426.03; 123/493, 90.18, 399, 345, 361

[56] References Cited

U.S. PATENT DOCUMENTS

| | | | |
|---|---|---|---|
| 4,708,101 | 11/1987 | Hara et al. | 123/90.18 X |
| 4,921,064 | 5/1990 | Wazaki et al. | 180/197 |
| 4,944,358 | 7/1990 | Wazaki et al. | 180/197 |

FOREIGN PATENT DOCUMENTS 49-33289 9/1974 Japan .
58-8436 1/1983 Japan .

Primary Examiner—Charles A. Marmor
Assistant Examiner—Paul Dickson
Attorney, Agent, or Firm—Armstrong, Nikaido, Marmelstein, Kubovcik & Murray

[57] ABSTRACT

A driving wheel slip control system for a vehicle equipped with an internal combustion engine capable of changing the valve lift characteristic of inlet and/or exhaust valves thereof. An output from the engine is decreased in response to a detected magnitude of slip of at least one of the driving wheels. An engine output decrement is changed in response to the changed valve lift characteristic.

6 Claims, 13 Drawing Sheets

DRIVING WHEEL SLIP CONTROL SYSTEM FOR VEHICLES

BACKGROUND OF THE INVENTION

This invention relates to a driving wheel slip control system for vehicles, and more particularly to a driving wheel slip control system for vehicles in which is installed an internal combustion engine capable of changing the valve lift characteristic of inlet valves and/or exhaust valves.

As recognized in general, a driving wheel of an automotive vehicle undergoes a slip when the vehicle is started to run or when it is accelerated, if the driving force of the diving wheel surpasses a frictional force developed between the tire of the driving wheel and the road surface [=the coefficient of friction between the tire and the road surface × load of the vehicle weight on the driving wheel (wheel load)]. Conventionally, a driving wheel slip control system has been proposed, e.g., by Japanese Provisional Patent Publication (Kokai) No. 58-8436, in which the degree of the slip is detected by a difference $\Delta V$ between the driving wheel speed and the trailing wheel speed, and when an excessive slip state in which the difference $\Delta V$ is great is detected, the amount of fuel supplied to the engine is reduced by fuel cut or by some other means, to thereby reduce the output torque (driving force) of the engine. In this driving wheel slip control system, as the degree of excessive slip is increased, fuel cut is effected to more cylinders.

In the meanwhile, a valve lift characteristic control system has been proposed. e.g., by Japanese Patent Publication (Kokoku) No. 49-33289, in which the valve lift characteristic of inlet valves and/or exhaust valves can be switched between a low speed valve lift characteristic suitable for a low engine rotational speed region and a high speed valve lift characteristic suitable for a high engine rotational speed region, and engine operating conditions (e.g. engine rotational speed, and intake pressure) are detected to thereby select one of the valve lift characteristics suitable for the detected engine operating conditions.

The output torque of an internal combustion engine which is capable of switching the valve lift characteristic changes relative to the engine rotational speed in dependence on the valve lift characteristic, e.g. as shown in FIG. 14. More specifically, on the lower engine rotational speed side (Ne<Nev). the output torque is larger when the low speed valve lift characteristic is selected than when the high speed valve lift characteristic is selected, while on the higher engine rotational speed side (Ne>Nev), the output torque is larger when the high speed valve lift characteristic is selected than when the low speed valve lift characteristic is selected. Thus, when the valve lift characteristic is changed over, the output torque of the engine changes. According to the conventional driving wheel slip control system, if the changeover is carried out during the driving wheel slip control, the slip state (magnitude of slip) of driving wheels is changed due to change in the output torque of the engine resulting from the changeover of the valve lift characteristic. The control system responds to the change in the slip state, and then the slip control suitable for the output torque of the engine is resumed. Therefore, it has been impossible to avoid change in the slip state of driving wheels resulting from changeover of the valve lift characteristic, which results in degraded driveability of the vehicle.

SUMMARY OF THE INVENTION

It is the object of the invention to provide a driving wheel slip control system for vehicles which is capable of controlling the slip of driving wheels of an automotive vehicle in which is installed an engine which can be switched in the valve lift characteristic, so that the slip state of the driving wheels is hardly changed even if the valve lift characteristic is switched during the driving wheel slip control, to thereby improve the driveability of the vehicle.

To attain the above object, the invention provides a system for controlling the slip of driving wheels of a vehicle equipped with an internal combustion engine having a set of inlet valves and a set of exhaust valves, including valve lift characteristic-changing means for changing the valve lift characteristic of at least one of the sets of the inlet valves and exhaust valves, driving wheel slip-detecting means for detecting a magnitude of slip of at least one of the driving wheels driven by the engine, and engine output-decreasing means responsive to an output from the driving wheel slip-detecting means for decreasing an output from the engine.

The system according to the invention is characterized by engine output decrement-changing means responsive to operation of the valve lift characteristic-changing means for changing a decrement by which the output from the engine is to be decreased by the engine output-decreasing means.

Preferably, the engine output decrement-changing means increases the engine output decrement when the valve lift characteristic-changing means operates to select a valve lift characteristic which enables to obtain a larger engine output, and decreases the engine output decrement when the valve lift characteristic-changing means operates to select a valve lift characteristic which enables to obtain a smaller engine output.

More preferably, the engine output decrement is determined based on at least one engine operating parameter, in addition to the output from the driving wheel slip-detecting means and the valve lift characteristic.

Further preferably, the engine includes an intake pipe, the at least one engine operating parameter comprising absolute pressure within the intake pipe and rotational speed of the engine.

Throughout the specification and claims, the term "valve lift characteristic" represents a valve opening period of an inlet and/or exhaust valve and/or an amount of lift of the inlet and/or exhaust valve.

The above and other objects, features, and advantages of the invention will become more apparent from the ensuing detailed description taken in conjunction with the accompanying drawings.

BRIEF DESCRIPTION OF THE DRAWINGS

FIG. 2b is a diagram showing a control device for the device of FIG. 2a.

DETAILED DESCRIPTION

The driving wheel slip control system according to the invention will now be described in detail with reference to the drawings showing an embodiment thereof.

Figure 1:
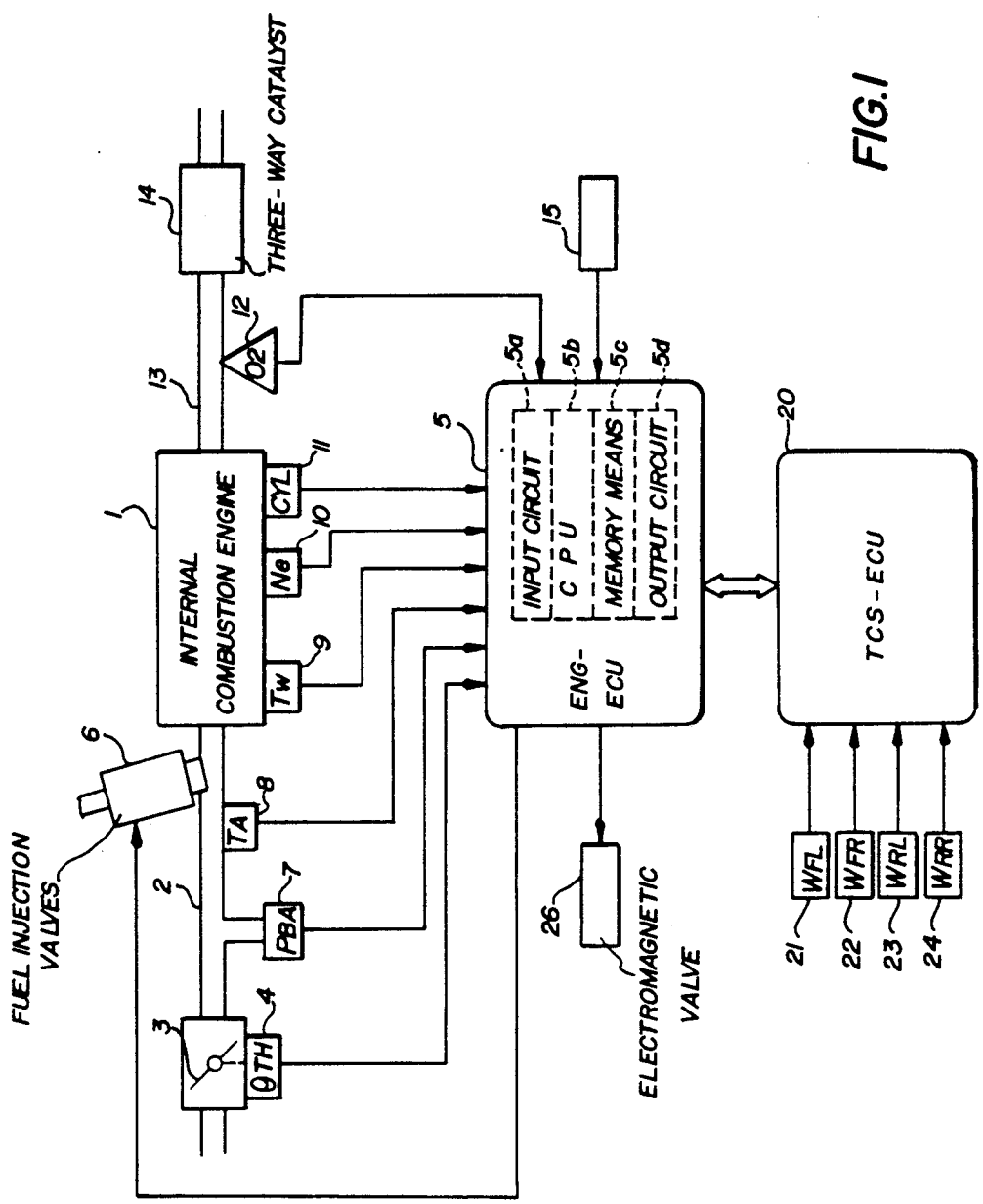
FIG. 1 is a schematic diagram showing the whole arrangement of a driving wheel slip control system according to an embodiment of the invention.

Referring first to FIG. 1, there is shown the whole arrangement of a fuel supply control system for an internal combustion engine, to which is applied the driving wheel slip control system according to the invention. In the figure, reference numeral 1 designates an internal combustion engine of DOHC in-line six cylinder type for automotive vehicles, in which two pairs of inlet and exhaust valves are provided for each cylinder. Connected to the cylinder block of the engine 1 is an intake pipe 2 in which is arranged a throttle valve 3. A throttle valve opening ($\theta_{TH}$) sensor 4 is connected to the throttle valve 3 for generating an electric signal indicative of the sensed throttle valve opening and supplying same to an electronic control unit for controlling the engine (hereinafter called "the ENG-ECU") 5.

Fuel injection valves 6, only one of which is shown, are inserted into the intake pipe at locations intermediate between the cylinder block of the engine 1 and the throttle valve 3 and slightly upstream of respective intake valves, not shown. The fuel injection valves 6 are connected to a fuel pump, not shown, and electrically connected to the ENG-ECU 5 to have their valve opening periods controlled by signals therefrom.

On the other hand, an intake pipe absolute pressure ($P_{BA}$) sensor 7 is provided in communication with the interior of the intake pipe 2 at a location immediately downstream of the throttle valve 3 for supplying an electric signal indicative of the sensed absolute pressure within the intake pipe 2 to the ENG-ECU 5. An intake air temperature ($T_A$) sensor 8 is inserted into the intake pipe 2 at a location downstream of the intake pipe absolute pressure sensor 7 for supplying an electric signal indicative of the sensed intake air temperature $T_A$ to the ENG-ECU 5.

An engine coolant temperature ($T_W$) sensor 9, which may be formed of a thermistor or the like, is mounted in the cylinder block of the engine 1, for supplying an electric signal indicative of the sensed engine coolant temperature $T_W$ to the ENG-ECU 5. An engine rotational speed (Ne) sensor 10 and a cylinder-discriminating (CYL) sensor 11 are arranged in facing relation to a camshaft or a crankshaft, not shown, of the engine 1. The engine rotational speed sensor 10 generates a pulse as a TDC signal pulse at each of predetermined crank angles whenever the crankshaft rotates through 120 degrees, while the cylinder-discriminating sensor 11 generates a pulse at a predetermined crank angle of a particular cylinder of the engine, both of the pulses being supplied to the ENG-ECU 5.

A three-way catalyst 14 is arranged within an exhaust pipe 13 connected to the cylinder block of the engine 1 for purifying noxious components such as HC, CO, and NOx. An $O_2$ sensor 12 as an exhaust gas ingredient concentration sensor is mounted in the exhaust pipe 13 at a location upstream of the three-way catalyst 14, for sensing the concentration of oxygen present in exhaust gases emitted from the engine 1 and supplying an electric signal indicative of the sensed oxygen concentration to the ENG-ECU 5.

Further electrically-connected to the ENG-ECU 5 is an electronic control unit for sensing driving wheel slip (hereinafter called "TCS-ECU") 20, to which are connected driving wheel speed sensors 21, 22 for detecting rotational speeds $W_{FR}$, $W_{FL}$ of respective right and left driving wheels, not shown, and trailing wheel speed sensors 23, 24 for detecting rotational speeds $W_{RR}$, $W_{RL}$ of respective right and left trailing wheels, not shown. Signals indicative of the detected rotational speeds of the wheels detected by the sensors 21 to 24 are supplied to the TCS-ECU 20.

Further electrically connected to the ENG-ECU is a battery voltage sensor 15, which detects the output voltage of a battery, not shown, which supplies an operating voltage to the ECU's 5 20, and supplies a signal indicative of the detected battery voltage to the ENG-ECU 5.

The ENG-ECU 5 is also connected to an electromagnetic valve 26, which changes over the valve timing of inlet and exhaust valves, as described detail hereinafter. In this connection, the term "valve timing" is identical in its meaning to the term "valve lift characteristic".

The ENG-ECU 5 comprises an input circuit 5a having the functions of shaping the waveforms of input signals from various sensors and the TCS-ECU 20 shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6 and the electromagnetic valve 26.

The CPU 5b operates in response to the above-mentioned signals from the sensors to determine operating conditions in which the engine 1 is operating, such as an air-fuel ratio feedback control region for controlling the air-fuel ratio in response to the output from the $O_2$ sensor 15 to a stoichiometric air-fuel ratio, and open-loop control regions, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ECU 5.

$$T_{OUT} = Ti \times K_{TCS} \times K_1 + K_2 \qquad (1)$$

where Ti represents a basic fuel amount, more specifically a basic fuel injection period of the fuel injection valves 6, which is determined based upon the engine rotational speed Ne and the intake pipe absolute pressure $P_{BA}$.

$K_{TCS}$ represents a leaning coefficient which is set to a value smaller than 1.0, as described in detail hereinafter, when an excessive slip state of the driving wheels is detected, and set to 1.0 when no excessive slip state is detected.

$K_1$ and $K_2$ represent other correction coefficients and correction variables, respectively, which are calculated based on various engine operating parameter signals to such values as to optimize operating characteristics of the engine such as fuel consumption and accelerability, depending on operating conditions of the engine.

The CPU 5b turns on and off the electromagnetic valve 26 to effect changeover of the valve timing in response to the detected engine operating conditions (e.g. sensed values of the engine rotational speed Ne, the intake pipe absolute pressure $P_{BA}$, and the engine coolant temperature $T_W$), as described hereinafter.

The CPU 5b supplies the output circuit 5d with driving signals for driving the fuel injection valves 6 and the electromagnetic valve 26 based upon the results of the above determinations and calculations.

In this embodiment, the ENG-ECU comprises part of valve lift characteristic-changing means, part of driving wheel slip-detecting means, engine output-decreasing means, and engine output decrement-changing means, while the TCS-ECU comprises part of the driving wheel slip-detecting means.

Figure 2A:
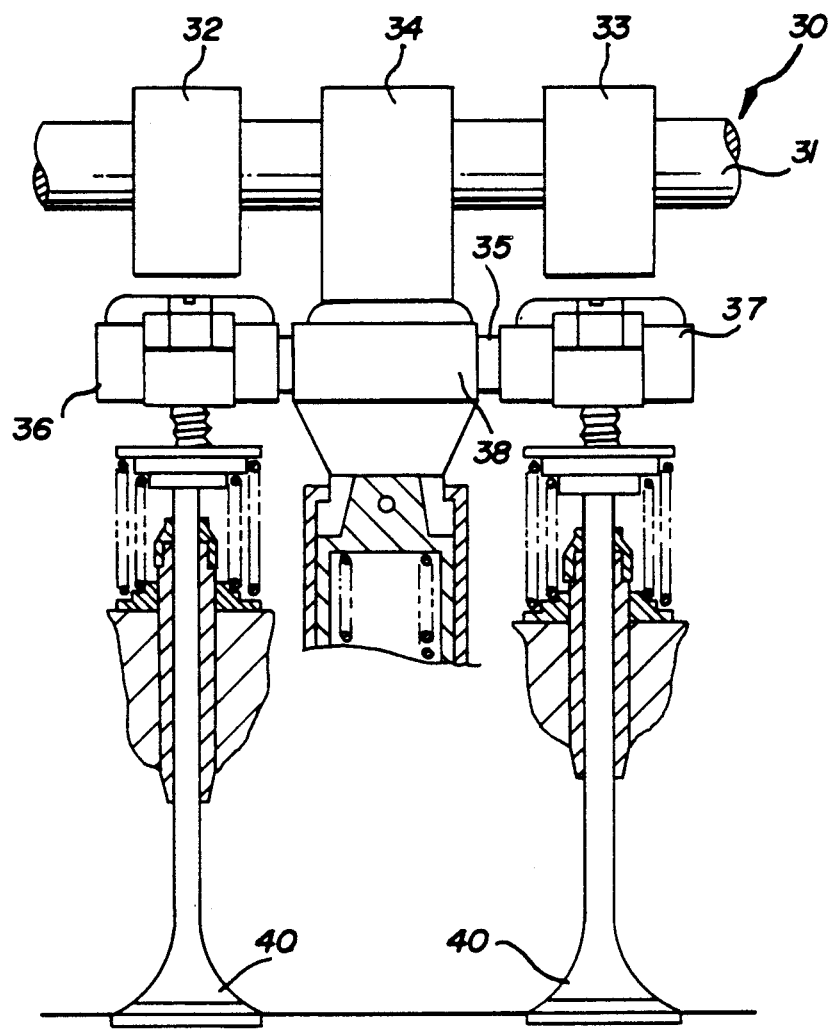
FIG. 2a is a diagram showing an inlet valveoperating device of an engine.
Figure 2B:
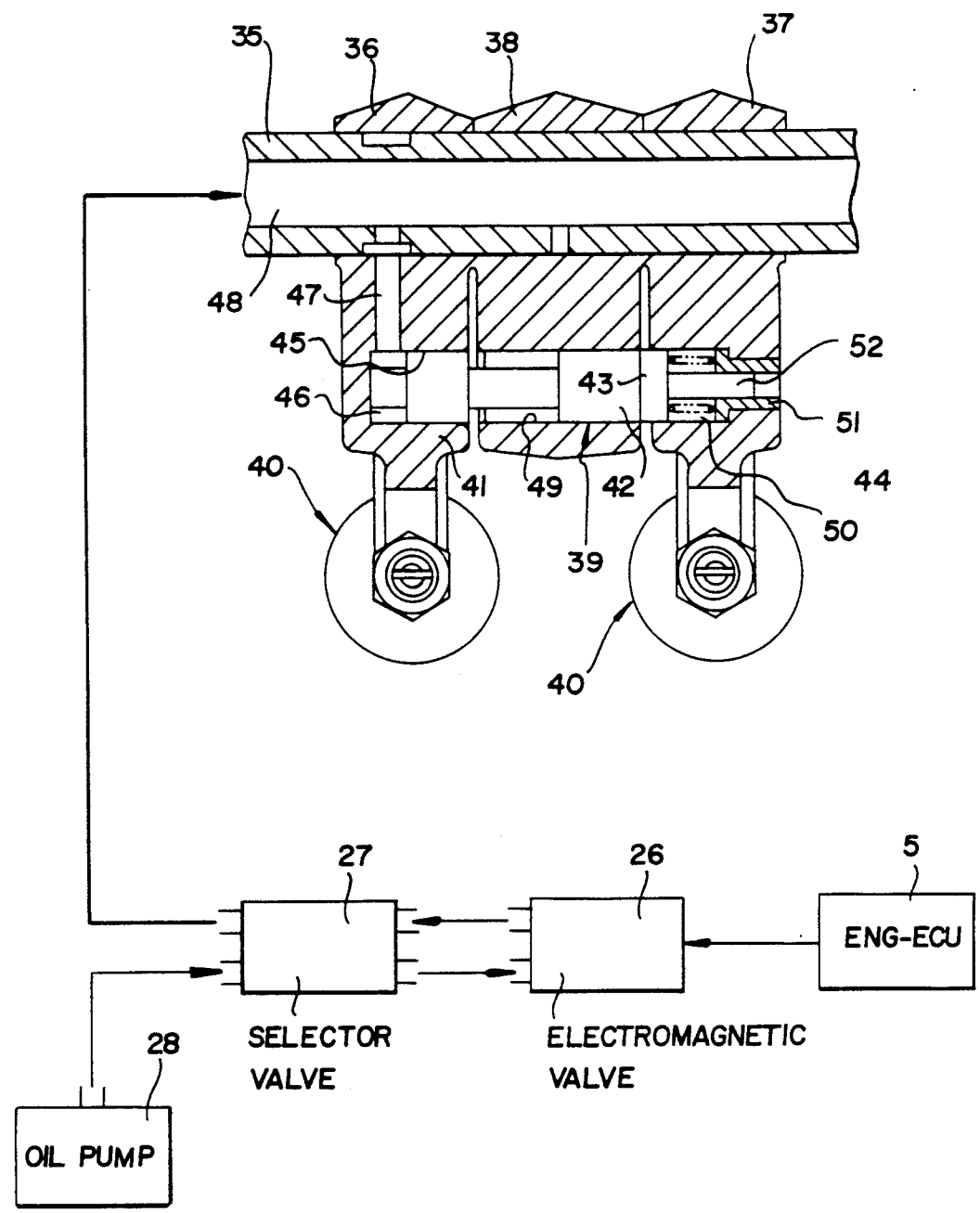

FIGS. 2a and 2b show an inlet valve-operating device 30 for driving the inlet valves 40 of each cylinder of the engine 1. An exhaust valve-operating device, not shown, basically having the same construction as this is provided for the exhaust valves. The inlet valve-operating device 30 comprises a camshaft 31 rotatively driven by a crankshaft, not shown, of the engine at a speed ratio of ½ relative to the latter, a high speed cam 34 and low speed cams 32, 33 secured on the camshaft 31 and provided for each cylinder, a rocker shaft 35 extending parallel with the camshaft 31, first and second driving rocker arms 36 and 37, and a free rocker arm 38 pivotally mounted on the rocker shaft 35, the three arms being provided for each cylinder, and a connection-changeover mechanism 39 arranged in the corresponding rocker arms 36, 37, 38 for each cylinder.

As shown in FIG. 2b, the connection-changeover mechanism 39 comprises a first changeover pin 41 capable of connecting the first driving rocker arm 36 with the free rocker arm 38, a second changeover pin 42 capable of connecting the second driving rocker arm 37 with the free rocker arm 38, a restriction pin 43 for restricting the movement of the first and second changeover pins 41, 42, and a return spring 44 urging the pins 41, 42, 43 in the rocker arm-disconnecting direction.

The first driving rocker arm 36 is formed therein with a first guide bore 45 extending parallel with the rocker shaft 35 with one end thereof closed and the other end opening in a side face thereof facing the free rocker arm 38. The first changeover pin 41 is slidably fitted in the first guide bore 45, defining an oil hydraulic chamber 46 between one end thereof and the closed end of the first guide bore 45. Further, a passage 47 extends in the rocker arm 36 and the rocker shaft 35 from the oil hydraulic chamber 46 and opens into an oil feeding passage 48 formed in the rocker shaft 35 so that the oil feeding passage 48 permanently communicates via the passage 47 with the oil hydraulic chamber 46 irrespective of rocking motion of the first driving rocker arm 36.

The free rocker arm 38 is formed therein with a guide through hole 49 at a location corresponding to the first guide bore 45, which extends through the free rocker arm 38 and parallel with the rocker shaft 35. The second changeover pin 42 is slidably fitted in the guide through hole 49, with one end thereof abutting on an opposed end face of the first changeover pin 41.

The second driving rocker arm 37 is formed therein with a second guide bore 50 at a location corresponding to the guide through hole 49, which extends parallel with the rocker shaft 35 with one end thereof opening toward the free rocker arm 38. The restriction pin 43 in the form of a disc is slidably fitted in the second guide bore 50, in a fashion abutting on the other end of the second changeover pin 42. Further, the second guide bore 50 has a guide sleeve 51 fitted therein, in which is slidably fitted an axial rod 52 which coaxially and integrally projects from the restriction pin 43. The return spring 44 is interposed between the guide sleeve 51 and the restriction pin 43 and urges the pins 41, 42, 43 toward the oil hydraulic chamber 46.

In the connection-changeover mechanism 39 constructed as above, when the pressure in the oil hydraulic chamber 46 is increased, the first changeover pin 41 is forced to move into the guide through hole 49 and at the same time the second changeover pin 42 is urgedly moved into the second guide bore 50 to connect the rocker arms 36, 37, 38 together. When the pressure in the oil hydraulic chamber 46 is decreased, the first changeover pin 4 is moved back by the urging force of the spring 44 into a position in which the end face thereof abutting on the second changeover pin 42 corresponds in location to the space between the first driving rocker arm 36 and the free rocker arm 38, and at the same time the second changeover pin 42 is moved back into a position in which the end face thereof abutting on the restriction pin 43 corresponds in location to the space between the free rocker arm 38 and the second driving rocker arm 37, whereby the rocker arms 36, 38, 37 become disconnected from each other.

The oil feeding passage 48 within the rocker shaft 35 is connected to an oil pump 28 via a selector valve 27 which operates to change over the oil pressure within the oil feeding passage 48 and hence the oil pressure within the oil hydraulic chamber 46 of the connection-changeover mechanism 39 between high and low levels. The selector valve 27 is connected to the electromagnetic valve 26, and the ENG-ECU controls the changeover operation of the selector valve 27 via the electromagnetic valve 26.

The inlet valve-operating device 30 of the engine 1 constructed as above operates in the following manner (in addition, the exhaust valve-operating device operates similarly):

When the ENG-ECU 5 sends out a valve-opening instruction signal to the electromagnetic valve 26, the electromagnetic valve 26 is opened to thereby cause the selector valve 27 to open, so that the oil pressure in the oil feeding passage 48 is increased. This causes the connection-changeover mechanism 39 to operate to connect the rocker arms 36, 37, 38 together, whereby the high speed cam 34 operates the rocker arms 36, 37, 38 in unison (FIG. 2a shows this state) to cause each pair of inlet valves 40 to open and close at high speed valve timing in which the valve-opening period and the valve lift amount are relatively greater.

On the other hand, when the ENG-ECU 5 supplies a valve-closing instruction signal to the electromagnetic valve 26, the electromagnetic valve 26 and in turn the selector valve 27 are closed to thereby decrease the oil pressure in the oil feeding passage 48. This causes the connection-changeover mechanism 39 to operate to disconnect the rocker arms 36, 37, 38 from each other, whereby the low speed cams 32, 33 operate the corresponding rocker arms 36, 37 to cause the pair of inlet valves 40 to open and close at low speed valve timing in which the valve-opening period and the valve lift amount are relatively smaller.

Figure 3:
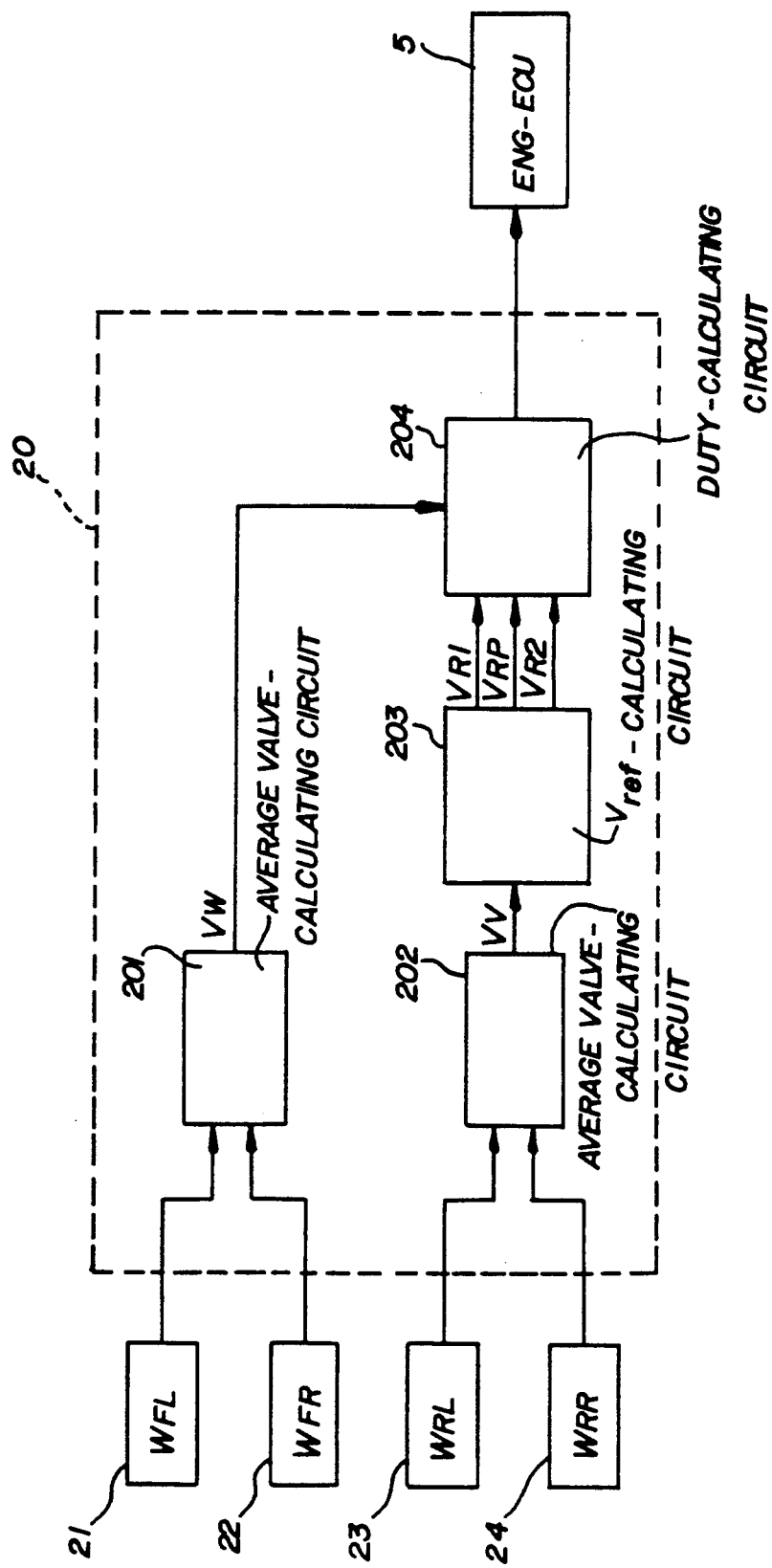
FIG. 3 is a block diagram showing the arrangement of an electronic control unit for detecting the slip of driving wheels.

FIG. 3 shows the internal construction of the TCS-ECU 20. Signals from the right and left driving wheel speed sensors 21, 22 are supplied to a first average value-calculating circuit 201, which calculates an average value $V_W (=(W_{FL}+W_{FR})/2)$ of the rotational speeds of the right and left driving wheels and supplies the calculated value to a DUTY-calculating circuit 204 referred to hereinafter.

On the other hand, signals from the right and left trailing wheel speed sensors 23, 24 are supplied to a second average value-calculating circuit 202, which calculates an average value $V_V (=(W_{RL}+W_{RR})/2)$ of the rotational speeds of the right and left trailing wheels as a vehicle speed, and supplies the calculated value to a reference driving wheel speed ($V_{ref}$)-calculating circuit 203. The reference driving wheel speed ($V_{ref}$)-calculating circuit 203 calculates a desired value $V_{RP}$ of the driving wheel speed, a first predetermined driving wheel speed $V_{R1}$, and a second predetermined driving wheel speed $V_{R2}$, as reference driving wheel speeds (Vref) corresponding to the vehicle speed $V_V$, and supplies the calculated values to the DUTY-calculating circuit 204.

Figure 4:
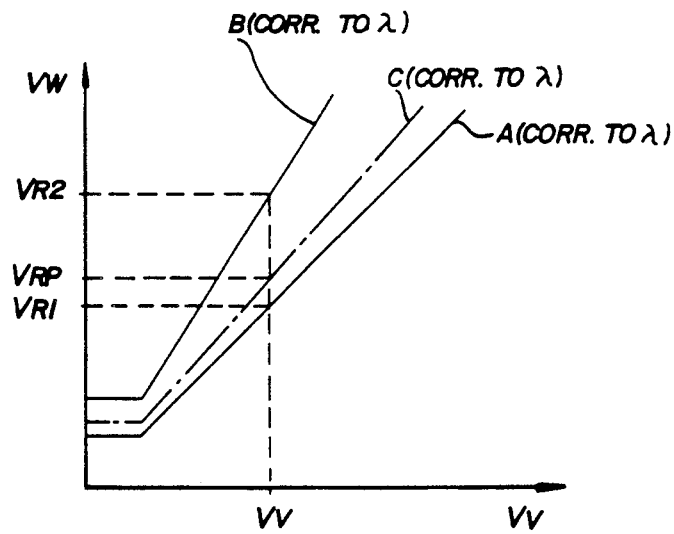
FIG. 4 is a graph showing the relationship between the vehicle speed and the driving wheel speed, dependent upon the slip rate of a driving wheel.

The three reference driving wheel speeds $V_{R1}$, $V_{R2}$, and $V_{RP}$ are calculated in accordance with lines A, B, and C which are depicted in the graph of FIG. 4 and represent the relationship between the vehicle speed $V_V$ and the driving wheel speed $V_W$. In general, the slip rate λ representing a magnitude of slip of driving wheels can be calculated by the following equation:

$$\lambda = (V_W - V_V)/V_W \quad (2)$$

Figure 5:
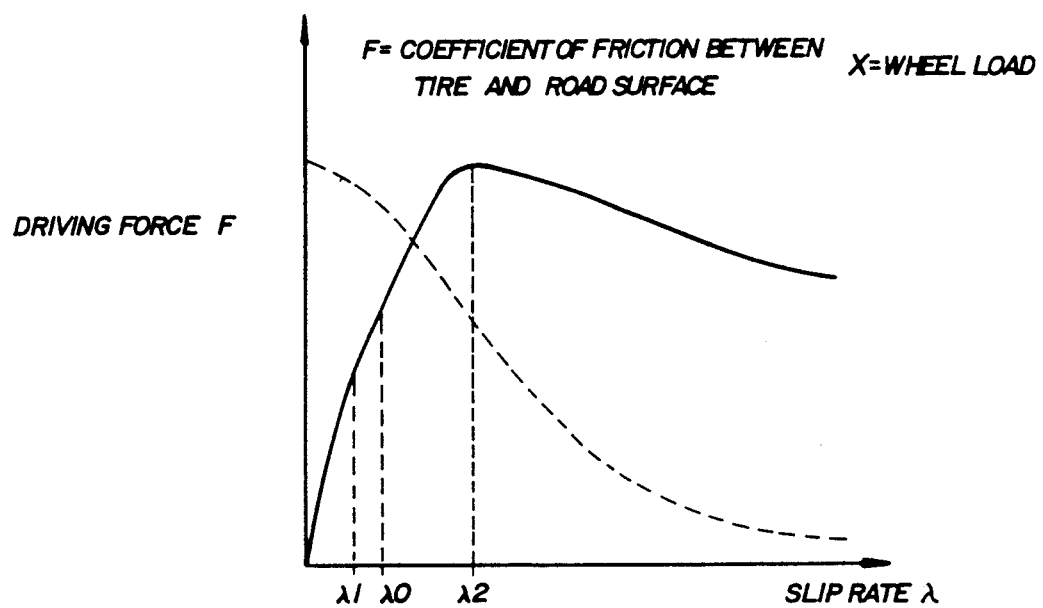
FIG. 5 is a graph showing the relationship between the slip rate of a driving wheel and the driving force of same.

As the slip rate λ increases, the driving force in a longitudinal direction of the vehicle (i.e. in the advancing direction of the vehicle), which is defined by the longitudinal frictional force between the tire and the road surface, increases, as illustrated by the solid line of FIG. 5, to reach the maximum value when the slip rate λ assumes a second predetermined slip rate value $\lambda_2$ (e.g. 15%). Then, the driving force decreases as the slip rate λ increases above the second predetermined slip rate value $\lambda_2$. The limiting transverse frictional force between the tire and the road, which acts in the transverse direction of the vehicle, varies with the slip rate λ, as indicated by the broken line in the graph, such that it becomes smaller as the slip rate increases. Therefore, when the slip rate λ exceeds the second predetermined slip rate value $\lambda_2$, the driving forces in the longitudinal and transverse directions of the vehicle both decrease, so that sufficient driving force or limiting transverse frictional force cannot be obtained. On the other hand, when the slip rate λ is smaller than a first predetermined slip rate value $\lambda_1$ (e.g. 5%), the driving wheel slip is below the critical or upper limit value, ensuring a stable grip of the tire on the road surface.

Taking the above points into consideration, the lines A and B of FIG. 4 are plotted such that they correspond, respectively, to the first and second slip rate values $\lambda_1$ and $\lambda_2$. When the driving wheel speed $V_W$ and the vehicle speed $V_V$ are in a region between the lines A and B, the driving force increases linearly with increase in the slip rate. Therefore, the driving wheel slip control based on the slip value DUTY referred to hereinafter is carried out so that the driving wheel speed is controlled to a predetermined value $V_{RP}$ (corresponding to the line C of FIG. 4) at which the slip rate λ assumes a predetermined value $\lambda_0$ (e.g. 8%).

The DUTY-calculating circuit 204 calculates a slip value DUTY corresponding to the magnitude of the driving wheel slip, by applying the detected driving wheel speed $V_W$, and the reference driving wheel speeds $V_{R1}$, $V_{R2}$, and $V_{RP}$ to the following equations (3) to (7), and supplies a DUTY signal corresponding to the result of the calculation to the ENG-ECU:

$$DUTY = (V_{RPn} - V_{R1n})/(V_{R2n} - V_{R1n}) - D_n \quad (3)$$

$$D_n = D_{n-1} + \Delta D_n \quad (4)$$

$$\Delta D_n = K_P \times \Delta V_{WP} + K_I \times (V_{RPn} - V_{Wn}) + \quad (5)$$

$$K_D \times (\Delta V_{Wn} - \Delta V_{Wn-1})$$

$$\Delta V_{Wn} = V_{Wn} - V_{Wn-1} \quad (6)$$

$$\Delta V_{WP} = (V_{Wn-1} - V_{RPn-1}) - (V_{Wn} - V_{RPn}) \quad (7)$$

where $K_P$, $K_I$, and $K_D$ represent predetermined proportional, integral, and differential gains, respectively. The subscripts n and n−1 indicate that the values concerned are present values and last values, since the calculation is repeated in a predetermined cycle.

By calculating the slip value DUTY by the use of the above equations (3) to (7), a so-called trace-type PID control is applied to the driving wheel slip control, so that the influence of noise components (error factor) contained in the detected driving wheel speed $V_W$ can be eliminated to carry out proper driving wheel slip control. The slip value DUTY is increased as the slip rate λ increases.

Figure 6A:
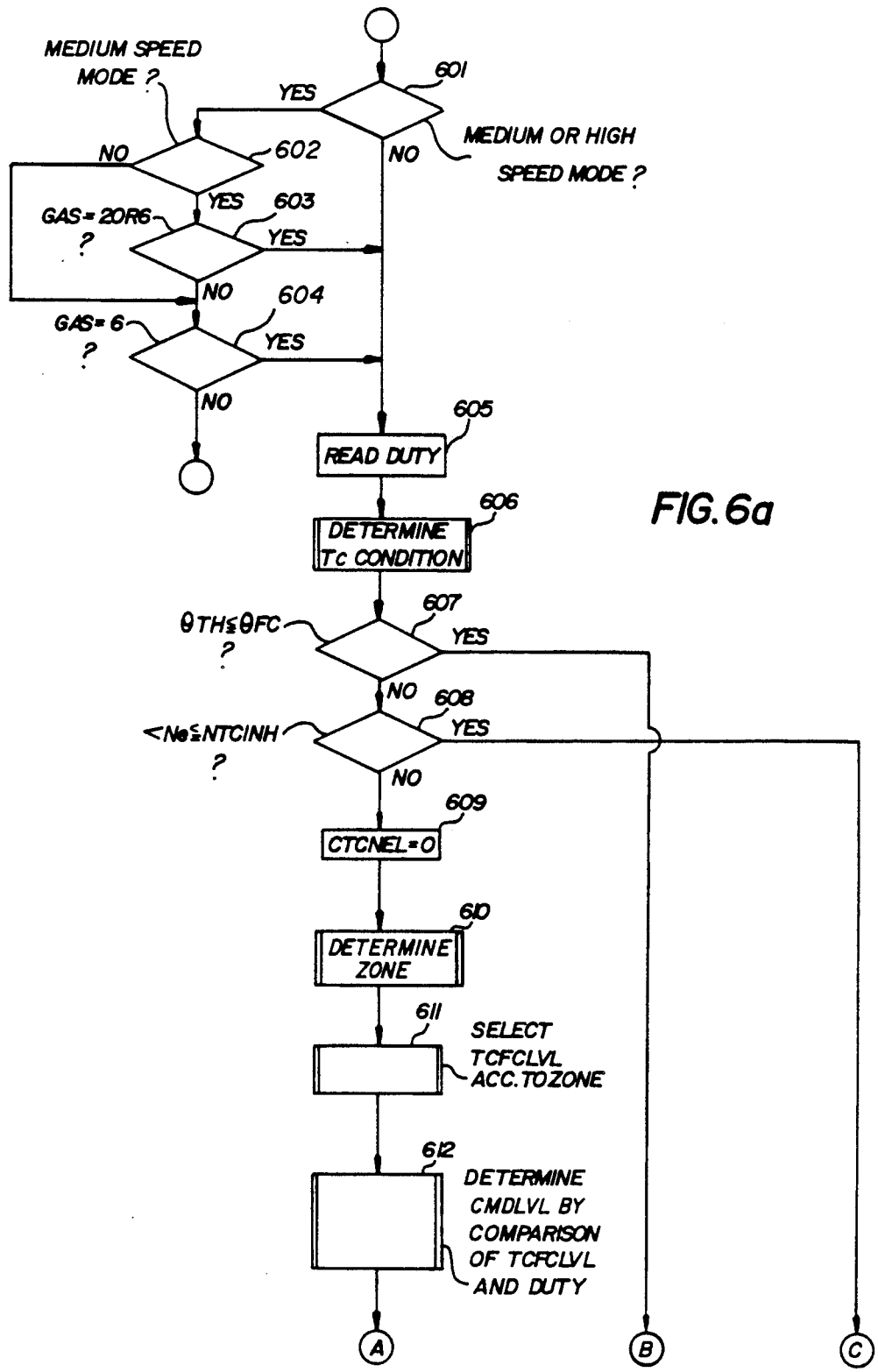
FIGS. 6a to 6c are a flowchart showing a program for carrying out the driving wheel slip control.
Figure 6B:
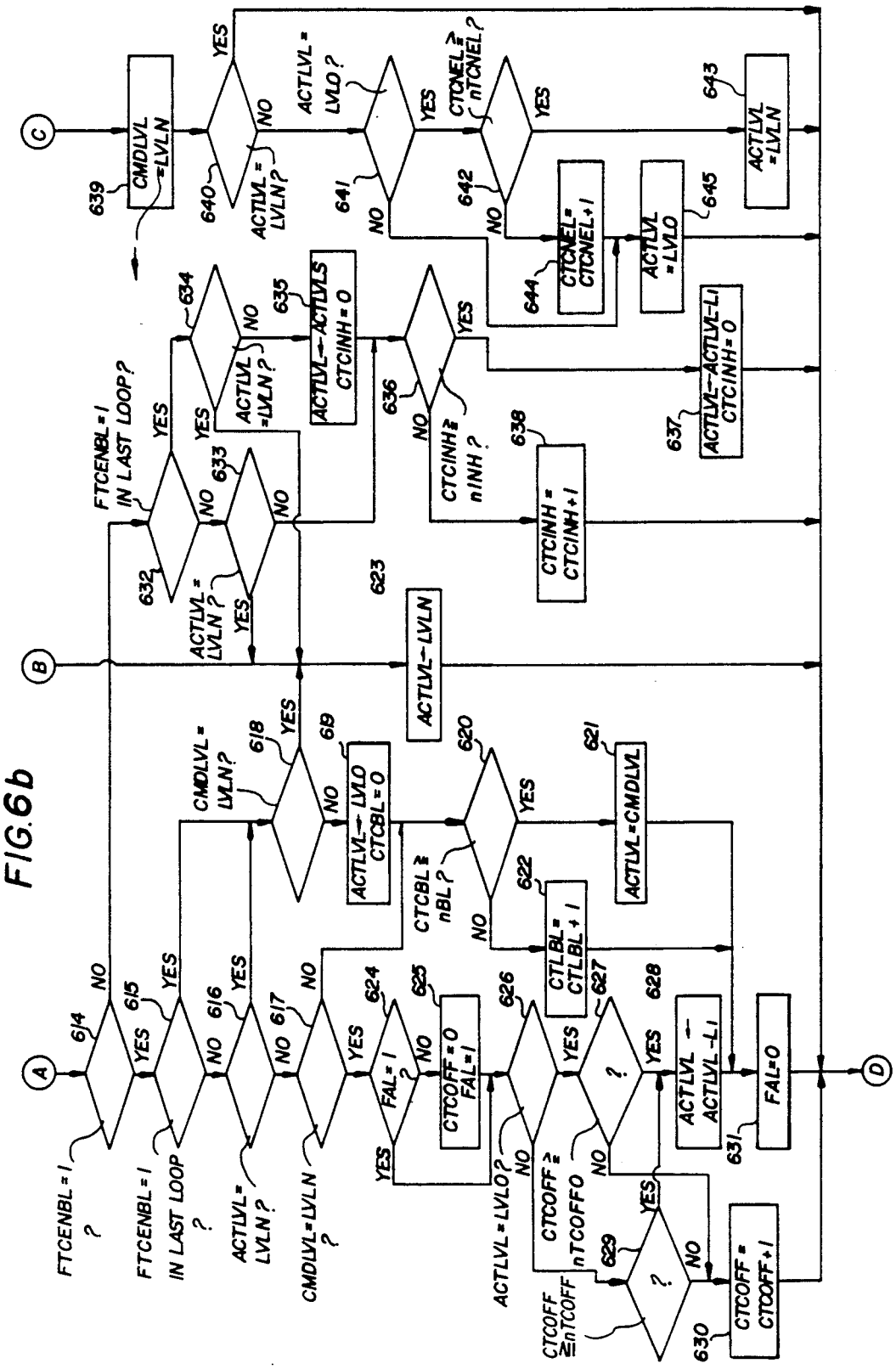
Figure 6C:
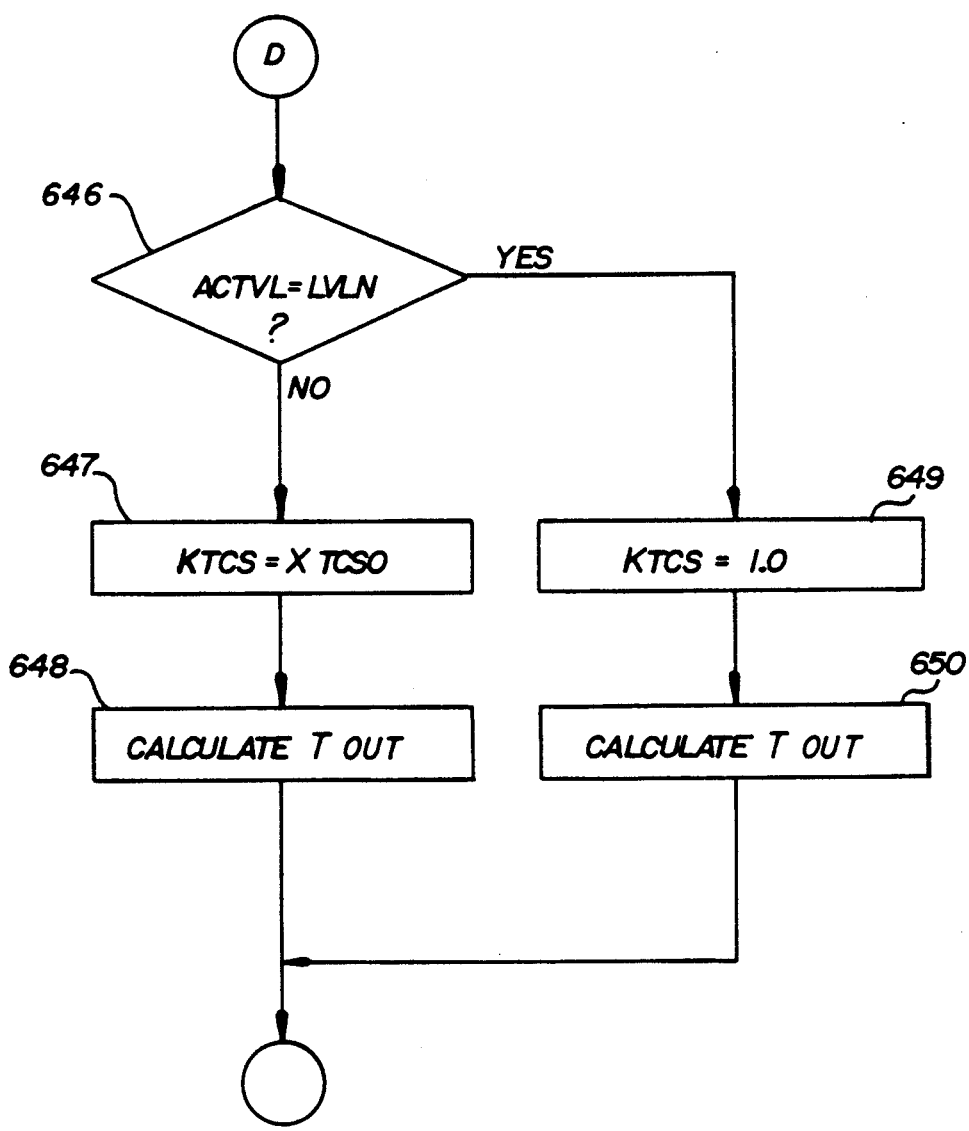

FIGS. 6a to 6c show a program for executing the engine output control (hereinafter called "the traction control") in which leaning or fuel cut of the air-fuel mixture supplied to the engine 1 is carried out in a selective manner based on the slip value DUTY by the ENG-ECU 5. The program is carried out in synchronism with generation of each TDC signal pulse. In addition, the program is based on the assumption that the engine 1 is a six cylinder type.

First, it is determined from the engine rotational speed Ne, at a step 601 whether the engine is in a high engine rotational speed mode or in a medium engine rotational speed mode. If the answer to this question is negative (No), i.e. if the engine is in a low engine rotational speed mode, the program immediately proceeds to a step 605. On the other hand, if the answer is affirmative (Yes), i.e. if the engine is in the high or medium engine rotational speed, it is further determined at a step 602 whether the engine is in the medium engine rotational speed mode. If the engine is in the medium engine rotational speed mode, it is determined at a step 603 whether or not a cylinder (hereinafter called "the present cylinder") into which fuel is to be injected in the present loop is a #2 cylinder or a #6 cylinder. If the answer to the question of the step 602 or 603 is negative (No), i.e. if the engine is in the high engine rotational speed mode or in the medium engine rotational speed mode and at the same time the present cylinder is neither the #2 nor the #6 cylinder, it is determined at a step 604 whether the present cylinder is the #6 cylinder. When the engine is in the medium engine rotational speed mode or the engine is in the high engine rotational speed mode and at the same time the present cylinder is not the #6 cylinder, the answer to the question of the step 604 is negative (No), and the present program is immediately terminated without carrying out the steps 605 et seq, so that the fuel injection (or fuel cut) and spark ignition are carried out based on the latest results of the operation of the program carried out up to the last loop. If the answer to the question of the step 603 or 604 is affirmative (Yes), i.e. if the engine is in the medium engine rotational speed mode and the present cylinder is the #2 or #6 cylinder, or if the engine is in the high engine rotational speed mode and the present cylinder is the #6 cylinder, the program proceeds to the step 605.

Figure 7:
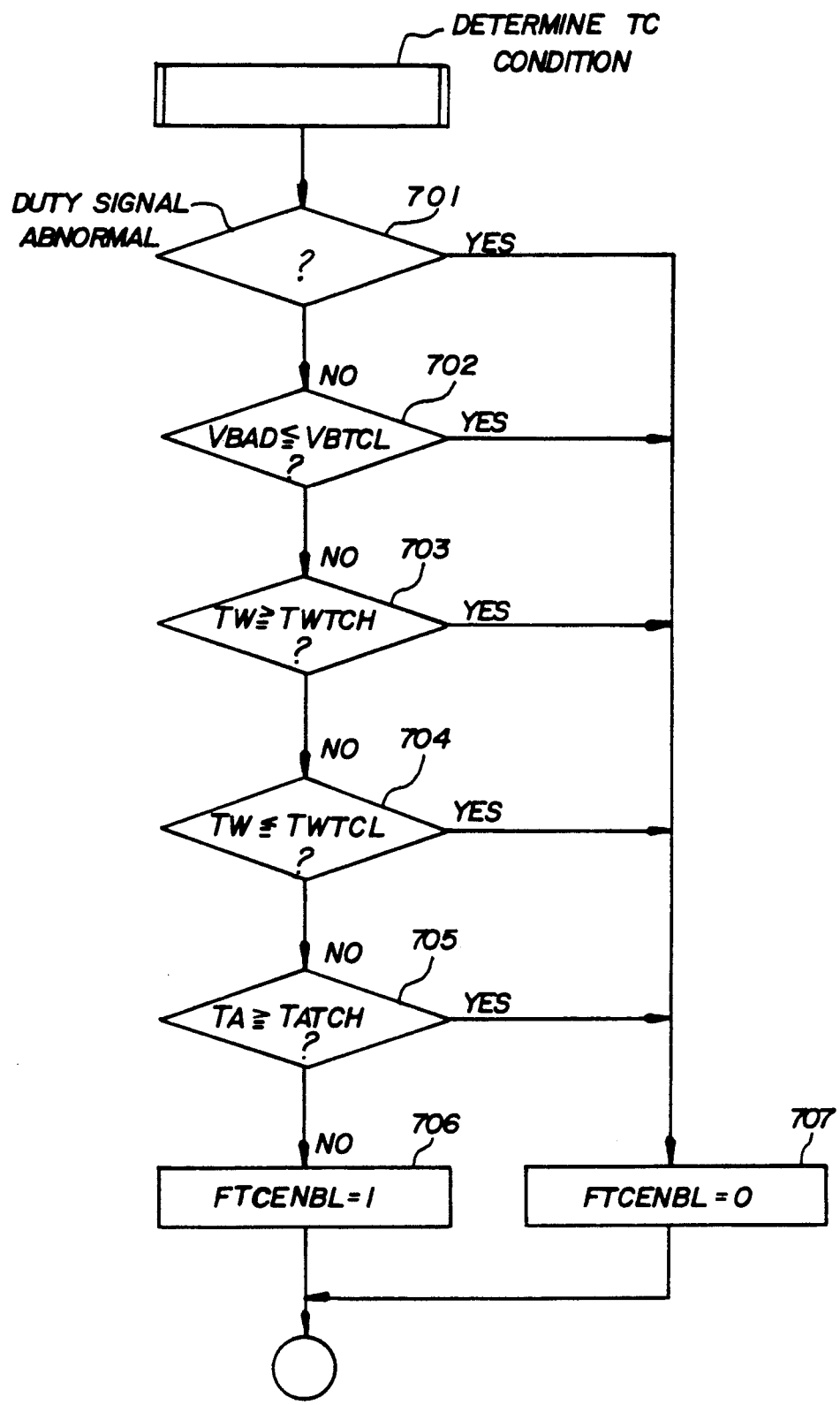
FIG. 7 is a flowchart showing a subroutine for determining whether the engine is under conditions (TC conditions) suitable for carrying out traction control by reducing the engine output.

At the step 605, the slip value DUTY is read, and then at a step 606 a TC condition-determining subroutine as shown in FIG. 7 is carried out for determining whether conditions (hereinafter called "TC conditions") under which the traction control is to be carried out are satisfied.

At a step 701 of FIG. 7, it is determined whether or not the DUTY signal is abnormal, i.e., the slip value DUTY is checked as to whether it is within a range defined by predetermined upper and lower limits. If the answer to this question is negative (No). i.e. if the DUTY signal is normal. It is determined at a step 702 whether or not the battery voltage $V_{BAD}$ is equal to or lower than a predetermined value $V_{BTCL}$ (e.g. 10V). If the answer to this question is negative (No), i.e. if $V_{BAD} > V_{BTCL}$, it is determined at a step 703 whether or not the engine coolant temperature $T_W$ is equal to or higher than a predetermined upper limit value $T_{WTCH}$ (e.g. 99° C.). If the answer to this question is negative (No), it is further determined at a step 704 whether or not the engine coolant temperature $T_W$ is equal to or lower than a predetermined lower limit value $T_{WTCL}$ (e.g. −29° C.). If the answer to this question is negative (No), i.e. if $T_W > T_{WTCL}$, it is determined at a step 705 whether or not the intake air temperature $T_A$ is equal to or higher than a predetermined upper limit value $T_{ATCH}$ (e.g. 69° C.). If the answer to any of the above steps 701 to 705 is affirmative (Yes), i.e. if any of the conditions of the DUTY signal being abnormal, $V_{BAD} \leq V_{BTCL}$, $T_W \geq T_{WTCH}$, $T_W \leq T_{WTCL}$, and $T_A \geq T_{ATCH}$, is satisfied, it is judged that the traction control should not be carried out since the TC conditions are not satisfied, and a TC condition flag FTCENBL is set to 0 at a step 707, followed by terminating the present program. This inhibition of the traction control is based on the following grounds: If the traction control is carried out, i.e. if leaning or fuel cut of the mixture to be supplied to the engine is carried out, (1) it is impossible to carry out the traction control properly when the DUTY signal is abnormal; (2) it is not guaranteed that the DUTY signal represents the actual slip state when the battery voltage $V_{BAD}$ is low ($V_{BAD} \leq V_{BTCL}$); (3) the engine cooling effect by the supply of fuel to the engine is lost to cause an unexpected damage to the engine when the engine temperature is high ($T_W \geq T_{WTCH}$, $T_A \geq T_{ATCH}$); and (4) misfiring may occur when the engine temperature is low ($T_W \leq T_{WTCL}$).

If all the answers to the above steps 701 to 705 are negative (No), i.e. if the DUTY signal is normal, and at the same time all the conditions of $V_{BAD} > V_{BTCL}$, $T_{WTCH} > T_W > T_{WTCL}$, and $T_A < T_{ATCH}$ are satisfied, it is judged that the TC conditions are satisfied, so that the TC condition flag FTCENBL is set to 1 at a step 706 followed by terminating the present subroutine.

Referring again to FIG. 6a, it is determined at a step 607 whether or not the throttle valve opening $\theta_{TH}$ is equal to or smaller than a predetermined value $\theta_{FC}$ (e.g. 1.5°). If the answer to this question is affirmative (Yes), i.e. if the throttle valve is substantially closed, it is judged that it is unnecessary to carry out the traction control, so that at a step 623 shown in FIG. 6b an actual traction control level (hereinafter called "the actual TC level"), referred to hereinafter, is set to a predetermined value LVLN, and the program proceeds to a step 646 shown in FIG. 6c. If the answer to the question of the step 607 is negative (No), i.e. if $\theta_{TH} > \theta_{FC}$, it is determined at a step 608 whether or not the engine rotational speed Ne is equal to or lower than a predetermined value NTCINH (e.g. 1500 rpm). If the answer to this question is affirmative (Yes), i.e. if Ne ≤ NTCINH, it is judged that the traction control should not be carried out, since engine stalling may occur if the traction control is carried out under such a low engine rotational speed condition, and the program proceeds to a step 639 shown in FIG. 6b. On the other hand, if the answer to the question of the step 608 is negative (No), i.e. if Ne > NTCINH, a first counter CTCNEL is set to 0 at a step 609. The first counter CTNEL is provided in order to gradually lower the traction control level, when the answer at the step 608 is changed from a negative one (No) to an affirmative one (Yes), i.e. when the engine rotational speed is changed from Ne > NTCINH to Ne ≤ NTCINH.

Next, based upon the engine engine rotational speed Ne, the intake pipe absolute pressure $P_{BA}$, and the valve timing, which has been selected to the high speed valve timing or the low speed valve timing, it is determined at a step 610 in which state of ZONE 1 to ZONE 8 the engine is operating. This determination may be carried out in accordance with a program shown in FIG. 8.

Figure 8:
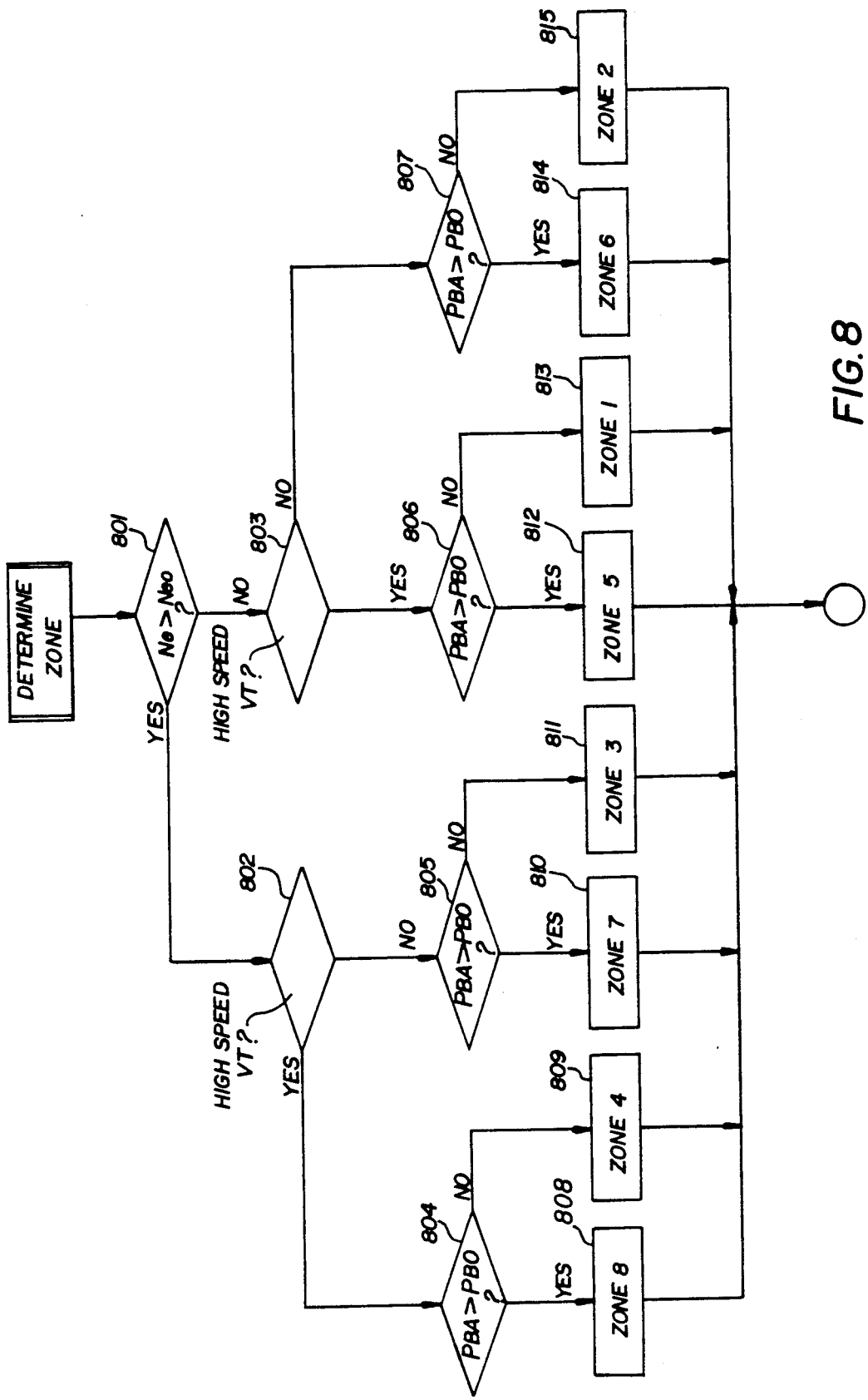
FIG. 8 is a flowchart showing a subroutine for determining engine operating conditions (ZONE 1 to ZONE 8) based upon the engine rotational speed, the intake pipe absolute pressure, and the valve lift characteristic.
Figures 9, 10:
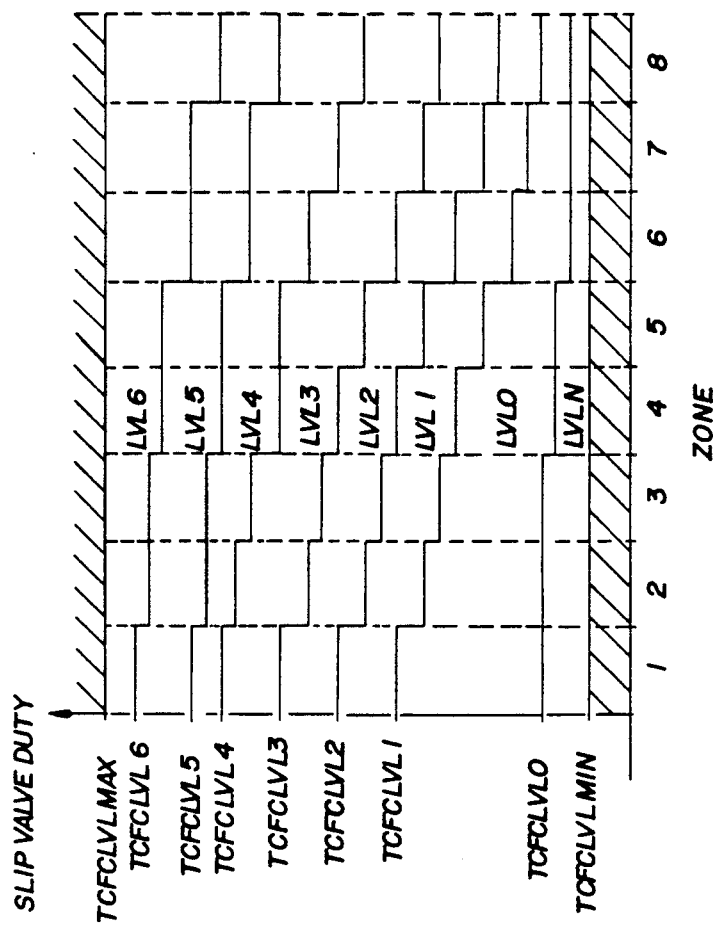
FIG. 9 is a view showing a table for determining the engine operating conditions by the subroutine of FIG. 8.
FIG. 10 is a view showing a table for determining a command traction control level depending on the engine operating conditions (ZONE 1 to ZONE 8) and the slip value.
Figure 14:
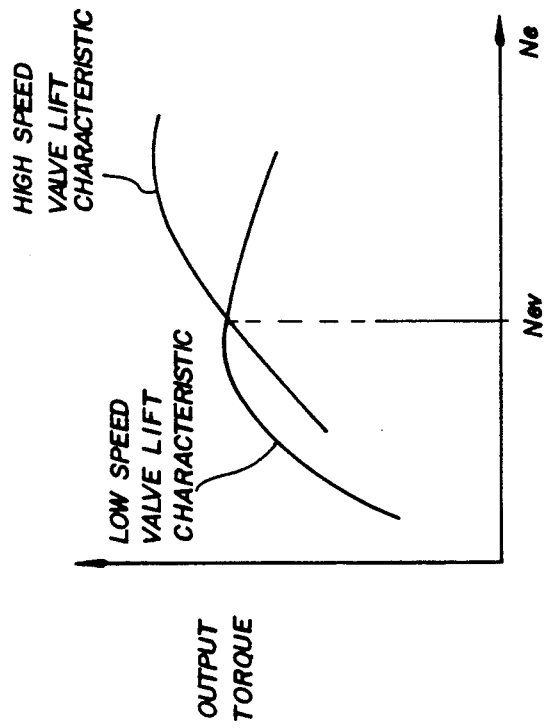
FIG. 14 is a graph showing variations in the engine output torque relative to the engine rotational speed, plotted with respect to the low speed and high speed valve lift characteristics.

In the ZONE-determining subroutine of FIG. 8, it is determined at a step 801 whether the engine rotational speed Ne is higher than a predetermined value $Ne_0$ (e.g. 3,500 rpm), at steps 802 and 803 whether the valve timing selected is the high speed valve timing, and at steps 804 to 807 whether the intake pipe absolute pressure $P_{BA}$ is higher than a predetermined value $P_{B0}$ (e.g. 610 mmHg). In accordance with the results of the above determinations, it is determined in which of ZONE 1 to ZONE 8 the engine operating condition falls. The ZONE 1 to ZONE 8 are determined as shown in FIG. 9. For example, if $P_{BA} \leq P_{B0}$ and $Ne \leq Ne_0$, and the high speed valve timing has been selected, the engine operating condition is determined to fall in ZONE 1, while if $P_{BA} \leq P_{B0}$ and $Ne \leq Ne_0$, and the low speed valve timing has been selected, the engine operating condition is determined to fall in ZONE 2.

The zones ZONE i to ZONE 8, in which the engine operating condition is determined to fall by the subroutine of FIG. 8, are provided such that as the number thereof increases from 1 to 8, the engine output is greater.

A command level (hereinafter called "the command TC level") for the traction control level (hereinafter called "the TC level") is determined based upon the ZONE determined at the step 610 and the slip value DUTY. A table for determining the command TC level is provided e.g. as shown in FIG. 10. According to the table of FIG. 10, the command TC level CMDLVL is determined as follows:

(1) if TCFCLVLMIN≦DUTY<TCFCLVL0,
    CMDLVL=LVLN
(2) if TCFCLVLi≦DUTY<TCFLVL(i+1),
    CMDLVL=LVLi (i=0 to 5)
(3) if TCFCLVL6≦DUTY<TCFCLVLMAX,
    CMDLVL=LVL6

It should be noted that if DUTY<TCFCLVLMIN, or DUTY ≧TCFCLVLMAX, in the TC condition determining subroutine of the step 606, it is determined that the DUTY signal is abnormal, and the flag FTCENBL is set to 0.

Figure 11:
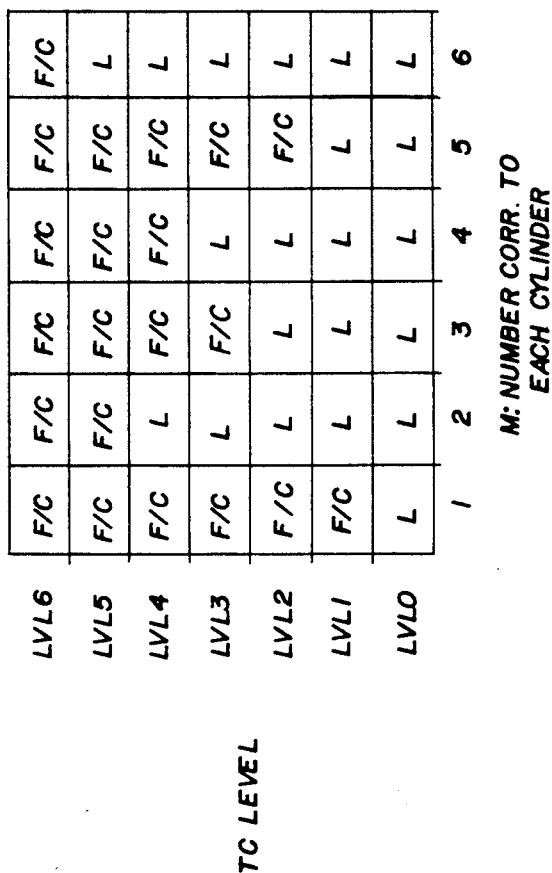
FIG. 11 is a view showing a table for determining a cylinder or cylinders for which leaning of the air/fuel mixture or fuel cut is to be effected in accordance with the determined command traction control level.

FIG. 11 shows a table for determining the manner of the traction control in accordance with the TC level. In the table, L represents leaning of the air-fuel mixture supplied to the engine, while F/C represents fuel cut. Further, the numbers M on the abscissa designate cylinders in such a manner that M=1 corresponds to a cylinder into which fuel should be first injected after the start of the traction control, and M=2 to 6 corresponds to respective cylinders into which fuel should be sequentially injected in the order shown by the number. For example, in the case of the TC level=LVLO, the air-fuel ratio of the mixture supplied to all the respective cylinders is leaned, and in the case of the TC level=LVL3, the cylinders corresponding to M=1, 3, and 5 are subjected to fuel cut while the other cylinders (corresponding to M=2, 4, and 6) are subjected to leaning of the air-fuel ratio.

In addition, LVLN appearing in FIG. 10 shows that no traction control should be carried out, i.e. The ordinary fuel supply control should be carried out.

Further, as is apparent from FIG. 10, the predetermined threshold value TCFCLVLi is set such that it assumes a smaller value as the ZONE number increases, i.e. the engine output increases. This setting is based upon the ground that it is necessary to vary the TC level based on the engine operating conditions even if the slip value DUTY assumes the same value, i.e. even if the driving wheel slip conditions are the same. More specifically, under engine operating conditions where the engine output is small, the driveability can be improved by gentle control since the degree of the slip of the driving wheels does not drastically increase to an excessive value, whereas under engine operating conditions where the engine output is large, more rapid control of the driving wheel slip must be effected, since under such high engine output operating conditions there is a possibility that largely excessive torque acts on the driving wheels, which may result in a drastic increase in the slip rate λ. Therefore, in this embodiment, the predetermined threshold values TCFCLVL0 to TCFCLVL6 are set for each ZONE determined based on the intake pipe absolute pressure $P_{BA}$, the engine rotational speed Ne, and the selected valve timing, so as to enable to control the fuel supply such that the number of cylinders to which fuel cut is effected is increased earlier when the engine output is large than when it is small.

Further, since the ZONE number is determined not only by the intake pipe absolute pressure $P_{BA}$ and the engine rotational speed Ne, but also by the selected valve timing, and the predetermined threshold value TCFCLVLi is determined depending on the thus determined ZONE number, stable traction control can be continued as described in detail hereinafter even if the valve timing is changed during the traction control.

Figure 12:
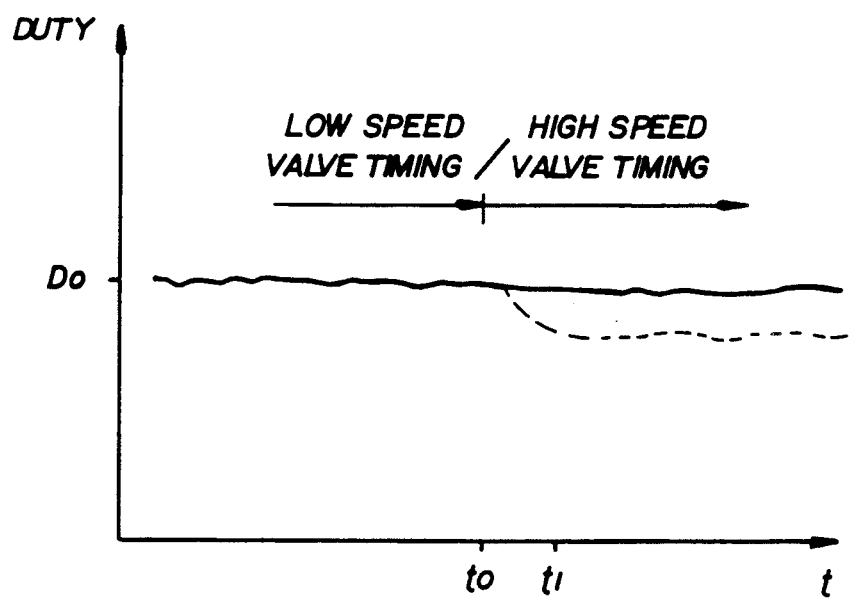
FIG. 12 is a graph showing a manner of change in the slip value duty, which takes place when the valve lift characteristic is change over.
Figure 13:
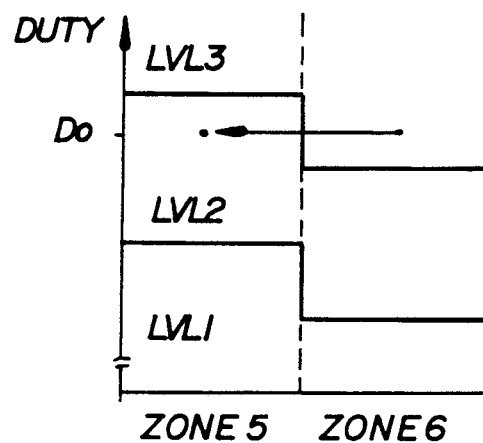
FIG. 13 is an enlarged fragmentary view of part of FIG. 10.

For example, if the valve timing is changed over to the high speed valve timing, under an engine operating condition of the ZONE 6 ($P_{BA}>P_{B0}$, $Ne \leq Ne_0$, and the low speed valve timing is selected), in the case of the driving wheel speed $V_W$ being controlled to a value substantially equal to the desired value $V_{RP}$ (which corresponds to a state in FIG. 12 before a time point $t_0$, in which the slip value DUTY is substantially constant at $D_0$), the engine operating condition changes from ZONE 6 to ZONE 5 (see FIG. 9). This change from ZONE 6 to ZONE 5 implies a decrease in the engine output (in the lower engine rotational speed ($Ne \leq Ne_0$), the engine output decreases if the valve timing is changed over from the low speed valve timing to the high speed valve timing). On this occasion, as shown in FIG. 13, the predetermined threshold value TCFCLVLi is increased to thereby change the TC level from LVL3 to LVL2, so that the number of cylinders to which fuel cut is effected is decreased from 3 to 2, which results in an increase in the engine output. Thus, the decrease in the engine output resulting from the changeover of the valve timing is immediately corrected, so that the slip value DUTY is hardly changed even after the time point $t_0$ to continue the state of the driving wheel slip control in which the driving wheel speed $V_W$ is controlled to the desired value $V_{RP}$. In other words, if the predetermined threshold value TCFCLVLi is not changed even with the changeover of the valve timing, a change in the engine output occurs, which necessitates correction of the slip value DUTY. Consequently, a change occurs in the slip rate, causing a shock after the time point $t_0$ and until the correction of the slip value DUTY is completed (a portion of the broken line between $t_0$ and $t_1$ in FIG. 12). which leads to degraded driveability resulting from the shock. Such unstableness in the traction control can be prevented by the above described control according to the present invention.

Referring again to FIG. 6a, at the step 611, the predetermined threshold value TCFCLVLi described above is selected in accordance with the ZONE determined at the step 610, and at a step 612 the command TC level (hereinafter simply called "CMDLVL") is determined based on the selected TCFCLVLi and the slip value DUTY. Then the program proceeds to a step 614 in FIG. 6b, where it is determined whether or not the TC condition flag FTCENBL is equal to 1. If the answer to this question is affirmative (Yes), i.e. if the TC conditions are satisfied, it is determined at a step 615 whether or not in the last loop (when the present program was carried out last time) the TC condition flag FTCENBL was equal to 1. If the answer to the question of the step 614 is affirmative (Yes), and if the answer to the question of the step 615 is negative (No), i.e. if the TC conditions were not satisfied in the last loop and are satisfied in the present loop, it is determined at a step 616 whether the actual TC level (hereinafter simply called "ACTLVL"), which is set in a manner described hereinafter, is LVLN. If the answer to the question of the step 615 or 616 is affirmative (Yes), i.e. if the TC conditions were satisfied in the last loop or if ACTLVL is LVN. it is determined at a step 618 whether CMDLVL is LVLN. If the answer to this question is affirmative (Yes), i.e. if CMDLVL is LVLN, requiring no traction control, ACTLVL is set to LVLN at a step 623, and then the program proceeds to a step 646 in FIG. 6c. On the other hand, if the answer to the question of the step 618 is negative (No), i.e. if CMDLVL is not LVLN, ACTLVL is set to LVL0 and at the same time a second counter CTCBL is set to a value of 0 at a step 619, and then the program proceeds to a step 620 where it is determined whether the value of the second counter CTCBL is equal to or higher than a predetermined value nBL (e.g. 40). In this case, the answer to the question of the step 620 is naturally negative (No), the count value of the second counter CTCBL is increased by an increment of 1 at a step 622, and the program proceeds to a step 631, where an after-TC flag FAL is set to a value of 0 in order to show that the traction control is being carried out.

On the other hand, if the answer to the question of the step 616 is negative (No), i.e. if ACTLVL is not LVLN, it is determined at a step 617 whether CMDLVL is LVLN. If the answer to this question is negative (No), i.e. if the traction control is required, the program proceeds to the step 620. If the answer to the question of the step 620 is negative (No), the program proceeds to the step 622, while if the answer is affirmative (Yes), ACTLVL is set to CMDLVL at a step 621, and then the program proceeds to the step 631.

The control carried out by the steps 615 to 623 is the traction control in the case where the traction control is started, as well as in the case where the traction control is being continued. According to the traction control by these steps, even if the driving wheel slip is suddenly increased to an excessive value, fuel cut responsive to the slip state is always preceded by the control by LVL0 in which the air-fuel ratio of the mixture to all the cylinders is leaned. Therefore, residual fuel adhering to the inner wall surfaces of the intake pipe is drawn into the cylinders during the control by LVL0, so that, even if the fuel cut is carried out thereafter, it is possible to prevent deterioration in the exhaust emission characteristics and hence degraded functioning of the exhaust gas purifying device (the three-way catalyst 14).

If the answer to the question of the step 616 is negative (No), i.e. ACTLVL is not LVLN, and at the same time if the answer to the question of the step 617 is affirmative (Yes), i.e. CMDLVL is LVLN, in other words, if the engine operating condition has shifted from a state requiring the traction control to a state no longer requiring the traction control, aftertraction control is carried out by the following steps 624 to 631.

First, it is determined at a step 624 whether the after-TC flag FAL has a value of 1. If the answer to this question is affirmative (Yes), the program jumps to a step 626, while if the answer is negative (No), a third counter CTCOFF is set to a value of 0 and at the same time the after-TC flag FAL is set to a value of 1 at a step 625, and then the program proceeds to the step 626. At the step 626, it is determined whether ACTLVL is LVL0. If the answer to this question is negative (No), it is determined at a step 629 whether or not the third counter CTCOFF assumes a value not lower than a third predetermined value nTCOFF (e.g. 20). If the answer to this question is negative (No), i.e. if CTCOFF<nTCOFF, the value of the third counter CTCOFF is increased by an increment of 1 at a step 630, and then the program proceeds to the step 646 in FIG. 6c. On the other hand, if the answer to the question of the step 629 is affirmative (Yes), i.e. if CTCOFF≧nTCOFF, the program proceeds to a step 628, where ACTLVL is lowered by 1 (e.g. if ACTLVL has been LVL3, it is newly set to LVL2), and the program proceeds to a step 631. Further, if the answer to the question of the step 626 is affirmative (Yes), i.e. if ACTLVL is LVL0, it is determined at a step 627 whether or not the third counter CTCOFF assumes a value not lower than a fourth predetermined value nTCOFFO (e.g. 40). If the answer to this question is negative (No), i.e. if CTCOFF≧nTCOFFO, the program proceeds to the step 630, whereas if the answer is affirmative (Yes), i.e. if CTCOFF≧nCTCOFFO, the program proceeds to the step 628.

The after-traction control carried out by the above steps 624 to 631 makes it possible to prevent a sudden rise in the engine output immediately after an excessive slip state of the driving wheels is dissipated, to thereby improve the driveability of the vehicle.

If the answer to the question of the step 614 is negative (No), i.e. if the TC conditions are not satisfied, it is determined at a step 632 whether the TC flag FTCENBL had a value of 1 in the last loop. If the answer to this question is affirmative (Yes), i.e. if the TC conditions were satisfied in the last loop, it is determined at a step 634 whether ACTLVL is LVLN. If the answer to this question is affirmative (Yes), the program proceeds to the step 623, whereas if the answer is negative (No), ACTLVL is set to ACTLVLS, which is a value of ACTLVL in the second latest loop and at the same time a fourth counter CTCINH is set to a value of 0 at a step 635, and then the program proceeds to a step 636, where it is determined whether the fourth counter CTCINH assumes a value not lower than a fifth predetermined value nINH (e.g. 30). In the case where the step 636 follows the step 635, the answer to the question of the step 636 is negative (No), and the value of the fourth counter CTCINH is increased by an increment of 1 at a step 638, the program proceeding to the step 646 in FIG. 6c.

If the answer to the question of the step 632 is negative (No), i.e. if the TC conditions were not satisfied in the last loop, it is determined at a step 633 whether ACTLVL is LVLN. If the answer to this question is affirmative (Yes), the program proceeds to the step 623, whereas if the answer is negative (No), the program proceeds to the step 636. If the answer to the question of the step 636 is negative (No), i.e. if CTCINH<nINH, the program proceeds to the step 638, whereas if the answer to same is affirmative (Yes), i.e. if CTCINH≧nINH, ACTLVL is lowered by 1 and at the same time the fourth counter CTCINH is set to a value of 0 at a step 637, and then the program proceeds to the step 646 in FIG. 6c.

The above steps 632 to 638 are carried out when the TC conditions are not satisfied. Particularly when the TC conditions cease to be satisfied during the traction control, it is possible to prevent a sudden rise in the engine output to thereby improve the driveability of the vehicle.

If the answer to the question of the step 608 is affirmative (Yes), i.e. if the engine rotational speed is low enough to satisfy the condition of Ne≦NTCINH, CMDLVL is set to LVLN at a step 639, and when it is determined at a step 640 whether ACTLVL is LVLN. If the answer to this question is affirmative (Yes), the program directly proceeds to the step 646 in FIG. 6c, whereas if the answer is negative (No), it is determined at a step 641 whether ACTLVL is LVLO. If the answer to this question is negative (No), ACTLVL is set to LVLO at a step 645, the program proceeding to the step 646 in FIG. 6c, whereas if the answer is affirmative (Yes), it is determined at a step 642 whether the first counter CTCNEL assumes a value not lower than a first predetermined value nTCNEL (e.g. 30). If the answer to this question is negative (No), i.e. if CTCNEL<nTCNEL, the value of the first counter CTCNEL is increased by an increment of 1, and then the program proceeds to the step 645, whereas if the answer is affirmative (Yes), i.e. if CTCNEL≧nTCNEL, the program proceeds to a step 643, where ACTLVL is set to LVLN, and then to the step 646 in FIG. 6c.

The control carried out by the above steps 639 to 645 makes it possible to prevent a sudden increase in the engine output when the engine rotational speed Ne decreases below the predetermined value NTCINH during the traction control, to thereby improve the driveability of the vehicle.

At the step 646 in FIG. 6c, it is determined whether ACTLVL is LVLN. If the answer to this question is negative (No), i.e. if ACTLVL is any of LVL0 to LVL6 during the traction control, the program proceeds to a step 647, where the leaning coefficient $K_{TCS}$ for the driving wheel slip control is set to a predetermined value $X_{TCSO}$ (which is smaller than 1.0 and adjusts the air-fuel ratio to, e.g. approximately 18.0) in order to lean the air-fuel ratio of the mixture. Then, the program proceeds to a step 648, where the fuel injection period $T_{OUT}$ is calculated in synchronism with each TDC signal pulse by applying the leaning coefficient $K_{TCS}$, together with the other correction coefficients and the correction variables calculated separately, to the equation (1) referred to hereinabove, followed by terminating the present program. After the termination of the present program, based on ACTLVL and the fuel injection period $T_{OUT}$ calculated as above, fuel injection (including fuel cut) is carried out.

On the other hand, if the answer to the question of the step 646 is affirmative, i.e. if ACTLVL is LVLN and accordingly the traction control is not required, the ordinary control is carried out. In other words, in the ordinary control, the leaning coefficient $K_{TCS}$ is set to a value of 1.0 at a step 649, and then the fuel injection period $T_{OUT}$ is calculated by applying the set leaning coefficient $K_{TCS}$, together with the correction coefficients and correction variables calculated separately to the equation (1) at a step 650, followed by terminating the present program.

What is claimed is:

1. In a system for controlling the slip of driving wheels of a vehicle equipped with an internal combustion engine having a set of inlet valves and a set of exhaust valves, including valve lift characteristic-changing means for changing the valve lift characteristic of at least one of said sets of said inlet valves and exhaust valves, driving wheel slip-detecting means for detecting a magnitude of slip of at least one of said driving wheels driven by said engine, and engine output-decreasing means responsive to an output from said driving wheel slip-detecting means for decreasing an output from said engine;

the improvement comprising:

engine output decrement-changing means responsive to operation of said valve lift characteristic-changing means for changing a decrement by which the output from said engine is to be decreased by said engine output-decreasing means.

2. A system according to claim 1, where in said engine output decrement-changing means increases said engine output decrement when said valve lift characteristic-changing means operates to select a valve lift characteristic which enables to obtain a larger engine output, and decreases said engine output decrement when said valve lift characteristic-changing means operates to select a valve lift characteristic which enables to obtain a smaller engine output.

3. A system according to claim 1 or 2, wherein said engine output decrement is determined based on at least one engine operating parameter, in addition to said output from said driving wheel slip-detecting means and said valve lift characteristic.

4. A system according to claim 3, wherein said engine includes an intake pipe, said at least one engine operating parameter comprising absolute pressure within said intake pipe and rotational speed of said engine.

5. A system according to claim 2, wherein said engine includes a plurality of cylinders, said engine output decrement being determined by the number of cylinders which are subjected to leaning of an air-fuel mixture supplied thereto, and the number of cylinders which are subjected to fuel cut.

6. A system according to claim 4, wherein when said engine rotational speed is higher than a predetermined value, said engine output decrement is set to larger values when a valve lift characteristic is selected which enables to obtain a larger engine output when said engine rotational speed is higher than said predetermined value, and when said engine rotational speed is lower than said predetermined value, said engine output decrement is also set to larger values when a valve lift characteristic is selected which enables to obtain a larger engine output when said engine rotational speed is lower than said predetermined value.

* * * * *